(12) United States Patent
Chung et al.

(10) Patent No.: US 9,315,642 B2
(45) Date of Patent: Apr. 19, 2016

(54) COMPOSITE AND METHOD FOR FORMING THE SAME

(71) Applicant: INDUSTRIAL TECHNOLOGY RESEARCH INSTITUTE, Hsinchu (TW)

(72) Inventors: Yao-Chu Chung, Pingtung (TW); Chun-Hsiung Liao, New Taipei (TW); Fu-Ming Chien, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/566,161

(22) Filed: Dec. 10, 2014

(65) Prior Publication Data

US 2015/0175771 A1 Jun. 25, 2015

(30) Foreign Application Priority Data

Dec. 20, 2013 (TW) .............................. 102147448 A

(51) Int. Cl.
| | | |
|---|---|---|
| C08K 3/22 | (2006.01) |
| C08K 3/26 | (2006.01) |
| C08K 3/30 | (2006.01) |
| C08L 23/12 | (2006.01) |
| C08J 3/20 | (2006.01) |

(52) U.S. Cl.
CPC . *C08K 3/22* (2013.01); *C08J 3/203* (2013.01); *C08K 3/26* (2013.01); *C08K 3/30* (2013.01); *C08J 2323/12* (2013.01); *C08K 2003/2224* (2013.01); *C08K 2003/2241* (2013.01); *C08K 2003/265* (2013.01); *C08K 2003/3045* (2013.01); *C08K 2201/005* (2013.01)

(58) Field of Classification Search
CPC .............. C08K 3/22; C08K 3/26; C08K 3/30; C08K 2003/2241; C08K 2003/265; C08K 2003/2224; C08K 2003/3045; C08L 23/12; C08J 3/203
USPC ....................................................... 524/423
See application file for complete search history.

(56) References Cited

U.S. PATENT DOCUMENTS

| 5,925,703 | A | 7/1999 | Betso et al. |
| 6,136,908 | A | 10/2000 | Liao et al. |
| 8,003,725 | B2 | 8/2011 | Chapman et al. |
| 8,119,725 | B2 | 2/2012 | Lustiger et al. |
| 2010/0189940 | A1 | 7/2010 | Grothe et al. |

FOREIGN PATENT DOCUMENTS

| CA | 2 548 549 A1 | 6/2007 | |
| CN | 1150161 A | 5/1997 | |
| CN | 1421485 A | 6/2003 | |
| CN | 101050289 A | 10/2007 | |
| CN | 201195384 Y | 2/2009 | |
| CN | 101518926 A | 9/2009 | |
| CN | 101831835 A | 9/2010 | |
| CN | 102140203 A | * 8/2011 | ......... B29C 47/0011 |
| CN | 102516663 A | 6/2012 | |
| CN | 102604185 A | 7/2012 | |
| CN | 102604228 A | * 7/2012 | |
| CN | 202293284 U | 7/2012 | |
| CN | 102634111 A | 8/2012 | |
| CN | 102344609 B | 10/2012 | |
| CN | 101845172 B | 1/2013 | |
| CN | 102875893 A | 1/2013 | |
| CN | 102966801 A | 3/2013 | |
| EP | 2 298 533 A1 | 3/2011 | |
| JP | 8-109277 A | 4/1996 | |
| JP | 2574168 B2 | 1/1997 | |
| JP | 2010-53332 A | 3/2010 | |
| JP | 2011-52196 A | 3/2011 | |
| JP | 5180882 B2 | 4/2013 | |
| TW | 201238737 A | 10/2012 | |
| TW | I389942 B | 3/2013 | |
| TW | I443117 B | 7/2014 | |
| WO | WO 96/23009 A1 | 8/1996 | |

OTHER PUBLICATIONS

Altan et al., "Mechanical and Antibacterial Properties of Injection Molded Polypropylene/TiO2 Nano-Composites: Effects of Surface Modification", Elsevier, J. Mater. Sci. Technol., 2012, vol. 28, No. 8, pp. 686-692.

Dangtungee et al., "Melt rheology and extrudate swell of titanium (IV) oxide nanoparticle-filled isotactic polypropylene: Effects of content and surface characteristics", Elsevier, Polymer Testing, 2008, vol. 27, pp. 951-956.

El-Dessouky et al. "Nanoparticles dispersion in processing functionalised PP/TiO2 nanocomposites: distribution and properties", J Nanopart Res, 2011, vol. 13, pp. 1115-1124.

Mina et al., "Improved performance of isotactic polypropylene/titanium dioxide composites: Effect of processing conditions and filler content", Elsevier, Polymer Degradation and Stability, 2009, vol. 94, pp. 183-188.

Wacharawichanant et al., "Effect of Mixing Conditions and Particle Sizes of Titanium Dioxide on Mechanical and Morphological Properties of Polypropylene/Titanium Dioxide Composites", Iranian Polymer Journal, 2009, vol. 18, No. 8, pp. 607-616.

\* cited by examiner

*Primary Examiner* — Michael M Bernshteyn
(74) *Attorney, Agent, or Firm* — Birch, Stewart, Kolasch & Birch, LLP

(57) ABSTRACT

A method for forming composite is provided. The method comprises following steps. Firstly, a polypropylene homopolymer and at least one kind of inorganic particles are provided to a twin screw extruder, wherein the polypropylene homopolymer occupies 40 wt %~90 wt % of the composite, the inorganic particles occupies 10 wt %~60 wt % of the composite, the melt flow index of the polypropylene homopolymer is lower than 3.6 g/10 min, and the particle sizes of the inorganic particles are in a range of 100 nm to 1000 nm. The polypropylene homopolymer is heated to a molten state. Then, the molten-state polypropylene homopolymer and the inorganic particles are enabled to pass through at least five kneading blocks of the twin screw extruder to be mixed together such that the inorganic particles are dispersed in the polypropylene homopolymer.

7 Claims, 4 Drawing Sheets

COMPOSITE AND METHOD FOR FORMING THE SAME

This application claims the benefit of Taiwan application Serial No. 102147448, filed Dec. 20, 2013, the disclosure of which is incorporated by reference herein in its entirety.

TECHNICAL FIELD

The disclosure relates in general to a composite and method for forming the same.

BACKGROUND

Polymer has been widely used in various products. In order to adjust the properties of the polymer to meet different requirements of use, normally the polymer is mixed with other materials to form a composite. For example, inorganic particles are added to the polymer to improve its stiffness, and elastomers are added to the polymer to improve its toughness. In addition, some auxiliary agents are added to the polymer. For example, dispersants are added to help the added materials, such as inorganic particles and elastomers, dispersed in the polymer, and interface modifiers are added to enhance the bonding strength between the added materials and the polymer base.

Nanometer (nm) sized inorganic particles are used to increase both the stiffness and the toughness of the polymer base. However, if the inorganic particles are not uniformly dispersed in the polymer base, a certain percentage of inorganic particles will form agglomerates, and satisfactory improvement in the properties of the composite will not be achieved.

SUMMARY

According to one embodiment, a method for forming composite is provided. The method comprises following steps. Firstly, a polypropylene (PP) homopolymer and at least one kind of inorganic particles are provided to a twin screw extruder, wherein the polypropylene homopolymer occupies 40 wt % to 90 wt % of the composite, the at least one kind of inorganic particles occupies 10 wt % to 60 wt % of the composite, the melt flow index (MI) of the polypropylene homopolymer is lower than 3.6 g/10 min, and the particle sizes of the inorganic particles are in a range of 100 nm to 1000 nm. The polypropylene homopolymer is heated to a molten state. Then, the molten-state polypropylene homopolymer and the inorganic particles are enabled to pass through at least five kneading blocks of the twin screw extruder to be mixed together such that the inorganic particles are dispersed in the polypropylene homopolymer.

According to another embodiment, a composite comprises a polypropylene homopolymer and at least one kind of inorganic particles is provided. The polypropylene homopolymer occupies 40 wt % to 90 wt % of the composite. The at least one kind of inorganic particles occupies 10 wt % to 60 wt % of the composite. The particle sizes of the inorganic particles are in a range of 100 nm to 1000 nm.

The above and other aspects of the disclosure will become better understood with regard to the following detailed description of the preferred but non-limiting embodiment(s). The following description is made with reference to the accompanying drawings.

Figure 1:
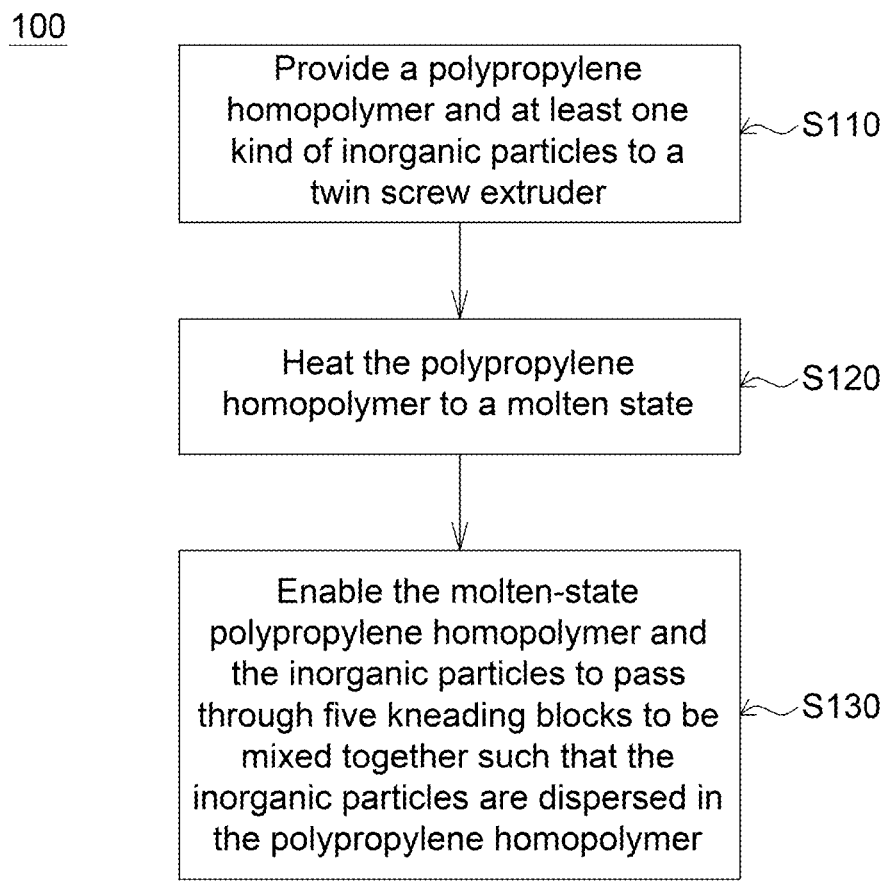
FIG. 1 is a flowchart of a method for forming composite according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of specific embodiments of the composite and the method for forming the same are disclosed below with accompanying drawings, exemplary examples and tables for detailed descriptions of the disclosure. However, the attached drawings, exemplary examples and tables only provide a part of the implementations of the disclosure, and the scope of protection of the disclosure is not limited to the embodiments of the disclosure. Also, in order to make the illustration clear, relative proportions and disposition of the elements may not be based on actual situations.

In the specification and claims of the disclosure, the numeric ranges defined by "higher than" and "lower than" do not comprise the endpoints of the numeric ranges. However, the numeric ranges not excluding the endpoints are regarded as comprising the endpoints of the ranges.

[Method for Forming Composite]

A composite and a method for forming the same are disclosed in embodiments of the present specification. Through the adjustment of the forming method, nm-sized inorganic particles are dispersed in a polymer to reduce agglomeration such that the composite can have better properties.

Referring FIG. 1, a flowchart of a method for forming composite 100 according to an embodiment of the disclosure is shown.

Firstly, the method begins at step S110, a polypropylene homopolymer and at least one kind of inorganic particles are provided to a twin screw extruder, wherein, the polypropylene homopolymer occupies 40 wt % to 90 wt % of the composite, and the at least one kind of inorganic particles occupies 10 wt % to 60 wt %. In some embodiments, the polypropylene homopolymer occupies 50 wt % to 90 wt % of the composite, and the at least one kind of inorganic particles occupies 10 wt % to 50 wt %. In some embodiments, the at least one kind of inorganic particles occupies 30 wt % to 50 wt % of the composite. For example, the at least one kind of inorganic particles occupies 40 wt % to 50 wt % or 46 wt % to 50 wt % of the composite.

In some embodiments, the melt flow index of the polypropylene homopolymer is lower than 3.6 g/10 min. The polypropylene homopolymer whose melt flow index is lower than 3.6 g/10 min is used because the viscosity (indicated by the melt flow index) of a material is related to the stress absorption of the material. That is, the viscosity of the polypropylene homopolymer relates to its toughness. In some embodiments, the melting point of the polypropylene homopolymer is ranged between 145° C. to 170° C. It is difficult for the inorganic particles to be dispersed in the polypropylene homopolymer whose melting point is ranged between 145° C. to 170° C.

In some embodiments, the particle sizes of the inorganic particles are between 100 nm to 1000 nm. In some embodiments, the at least one kind of inorganic particles comprises at least one of titanium dioxide ($TiO_2$), calcium carbonate ($CaCO_3$), magnesium hydroxide ($Mg(OH)_2$) and barium sulfate ($BaSO_4$). For example, the at least one kind of inorganic particles comprises two or three of titanium dioxide ($TiO_2$), calcium carbonate ($CaCO_3$), magnesium hydroxide ($Mg(OH)_2$) and barium sulfate ($BaSO_4$).

In some embodiments, the polypropylene homopolymer can be preheated to have fluidity which facilitates the feeding of the polypropylene homopolymer. In some embodiments, the preheating step is performed under the temperature of 140° C. to 160° C.

Next, the method proceeds to step S120, the polypropylene homopolymer is heated to a molten state. The inorganic particles can be preliminarily dispersed in the molten-state polypropylene homopolymer. In some embodiments, the inorganic particles are heated at the same time with the polypropylene homopolymer. In some embodiments, the polypropylene homopolymer and the inorganic particles are heated to a temperature in the range of 180° C. to 230° C.

Then, the method proceeds to step S130, the molten-state polypropylene homopolymer and the inorganic particles are enabled to pass through at least five kneading blocks to be mixed together such that the inorganic particles are dispersed in the polypropylene homopolymer and a composite can be obtained. The number of the kneading blocks is at least five. The kneading blocks assist the polypropylene homopolymer and the inorganic particles to be mixed uniformly. In some embodiments, each of the kneading blocks comprises five kneading discs. The kneading blocks are interspaced by conveying elements (such as screws) instead of one leaning against another. In some embodiments, adjacent two of the kneading blocks are interspaced by 0.5 to 2 screw pitches. The spacing between the kneading blocks should not be too wide lest the polypropylene homopolymer and the inorganic particles which have been mixed together might be separated from each other. Through the at least five continuous kneading blocks, the molten-state polypropylene homopolymer and the inorganic particles can be mixed together continuously. In some embodiments, the step of enabling the polypropylene homopolymer and the inorganic particles to pass through kneading blocks is performed under the temperature of 180° C. to 230° C.

After a molten-state composite is obtained step S130, the mixture of the polypropylene homopolymer and the inorganic particles is further cooled to obtain a solid-state composite by using the water-cooled pull strip cutting method which further processes the solid-state composite into granules. The inorganic particles are well dispersed in the obtained solid-state composite. In some embodiments, the agglomerates of the inorganic particles whose sizes are larger than 1 μm occupy less than 10% of the area of the solid-state composite.

Then, the solid-state composite can be further processed to form various products. For example, various products can be formed by an injection molding machine under the temperature of 210° C.

The method for forming composite according to an embodiment of the disclosure uses a polypropylene homopolymer having certain level of strength (the melt flow index is lower than 3.6 g/10 min) and one kind of nm-sized inorganic particles having uniform dispersion and minor agglomeration to form a composite having high stiffness and toughness without adding extra elastomers (used for increasing toughness). Also, by enabling the polypropylene homopolymer and the inorganic particles to pass through more kneading blocks, the method for forming composite according to an embodiment of the disclosure can achieve better effects of mixing and dispersion without adding extra dispersants.

Figure 2:
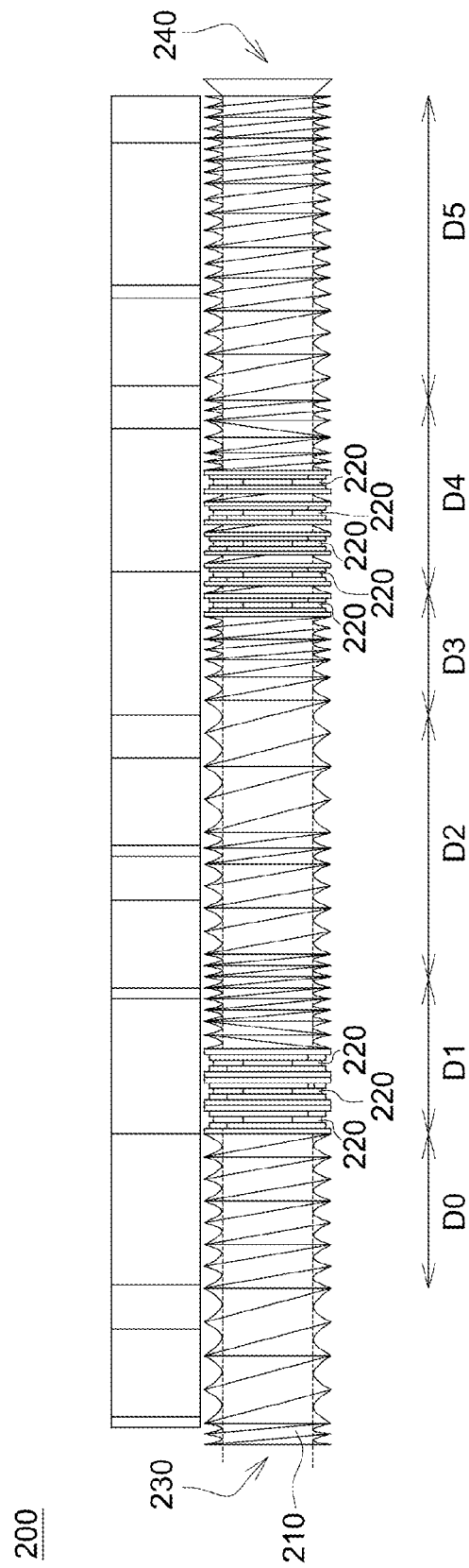
FIG. 2 is a schematic diagram of a twin screw extruder used in a method for forming composite according to an embodiment of the disclosure.

Details of the method for forming composite according to an embodiment of the disclosure are disclosed below with specific embodiments. Referring to FIG. 2, a schematic diagram of a twin screw extruder 200 used in a method for forming composite 100 according to an embodiment of the disclosure is shown. For the convenience of description, FIG. 2 only schematically illustrates a screw 210, kneading blocks 220, a feed end 230, an exit 240 of a twin screw extruder 200 and regions D0~D5 having different temperatures. The thread of the screw 210, the number and positions of the kneading blocks 220, and the number and positions of the regions D0~D5 can be adjusted to optimize the manufacturing process.

In the example of FIG. 2, the polypropylene homopolymer and the inorganic particles are fed to the twin screw extruder 200 from the feed end 230 at the left end. The polypropylene homopolymer and the inorganic particles can be separately provided to the twin screw extruder 200 or can be mixed together and then provided to the twin screw extruder 200. In the present example, the polypropylene homopolymer and the inorganic particles are preheated in the region D0 under the temperature of 160° C. Then, the polypropylene homopolymer and the inorganic particles are enabled to pass through three kneading blocks to be preliminarily mixed together. The polypropylene homopolymer and the inorganic particles having been preliminarily mixed are enabled to pass through the region D1 under the temperature of 210° C. Then, the polypropylene homopolymer and the inorganic particles are enabled to pass through the region D2 under a slightly higher temperature such as 220° C. The polypropylene homopolymer and the inorganic particles enter the region in which five continuous kneading blocks 220 are disposed from the ending part of the region D3 under the temperature of 220° C. After passing through the five continuous kneading blocks 220, the polypropylene homopolymer and the inorganic particles enter the region D4 under the temperature of 210° C. Then, the polypropylene homopolymer and the inorganic particles enter the region D5 under a lower temperature such as 200° C. The molten-state composite leaves the twin screw extruder 200 via the exit 240. In the example of FIG. 2, the five continuous kneading blocks 220 are disposed in the region in which the temperature of the twin screw extruder 200 starts to decrease, that is, the five continuous kneading blocks 220 are disposed at junction between the region D4 and the region D5. However, the five continuous kneading blocks 220 can be disposed in other parts of the regions D1~D5, and are not limited thereto.

Figure 3A:
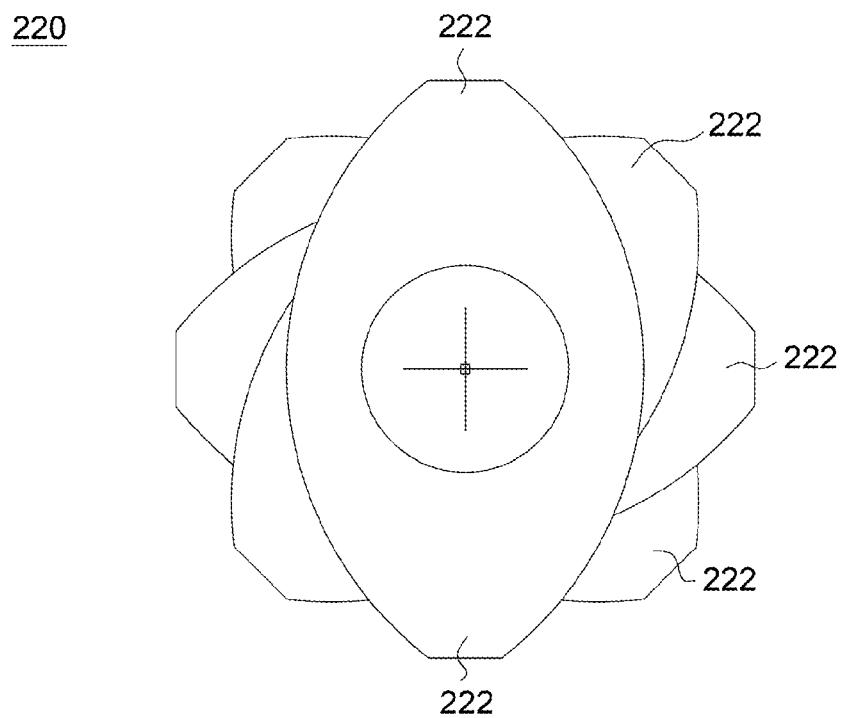
FIG. 3A~FIG. 3B are schematic diagrams of kneading blocks used in a method for forming composite according to an embodiment of the disclosure.
Figure 3B:
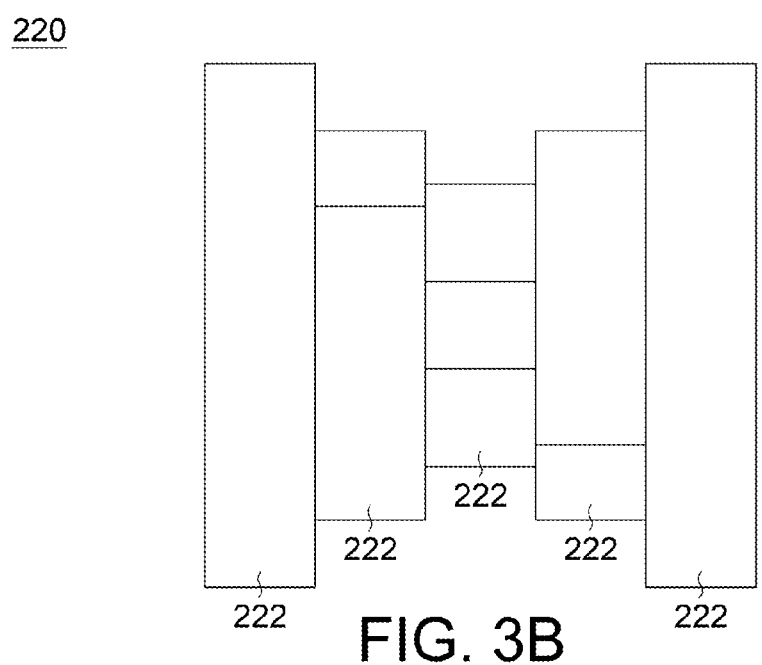

The kneading blocks 220 are interspaced by conveying elements (such as screws 210) instead of leaning against one another. However, the spacing between the kneading blocks 220 should not be too wide lest the polypropylene homopolymer and the inorganic particles which have been mixed together might be separated again. In some embodiments, adjacent two of the kneading blocks 220 are interspaced by 0.5~2 screw pitches. In the example of FIG. 2, adjacent two of the five kneading blocks 220 are interspaced by 0.5 screw pitch. Structures of the kneading blocks 220 are illustrated in FIG. 3A and FIG. 3B. FIG. 3A illustrates the kneading blocks 220 viewed towards the exit 240 from the feed end 230 of FIG. 2. FIG. 3B illustrates the kneading blocks 220 viewed from the direction of the paper. Each kneading block 220 comprises five kneading discs. Each kneading disc is inclined with respect to its previous kneading disc. For example, each kneading disc is inclined to 45° with respect to its previous kneading discs.

By using the twin screw extruder 200 equipped with five continuous kneading blocks 220, the inorganic particles can be uniformly dispersed even in the polypropylene homopolymer base whose melting point is between 145° C.~170° C. which is difficult for the inorganic particles to be dispersed therein. Therefore, the forming method 100 of the disclosure is capable of forming a composite which is well-mixed and uniformly dispersed.

[Composite]

The composite forming by using the forming method 100 of the above embodiments comprises a polypropylene homopolymer and at least one kind of inorganic particles. The polypropylene homopolymer occupies 40 wt % to 90 wt % of the composite, and the at least one kind of inorganic particles occupies 10 wt % to 60 wt % of the composite. In some embodiments, the polypropylene homopolymer occupies 50 wt % to 90 wt % of the composite, the at least one kind of inorganic particles occupies 10 wt % to 50 wt % of the composite. In some embodiments, the at least one kind of inorganic particles occupies 30 wt % to 50 wt % of the composite. For example, the at least one kind of inorganic particles occupies 40 wt % to 50 wt % or 46 wt % to 50 wt % of the composite.

The inorganic particles have particle sizes between 100 nm to 1000 nm, and are dispersed in the polypropylene homopolymer. The observation made by using an apparatus such as a scanning electronic microscopy shows that the agglomerates of the inorganic particles whose sizes are larger than 1 μm occupy less than 10% of the area of the composite. In some embodiments, the inorganic particles at least one kind of comprise at least one of titanium dioxide ($TiO_2$), calcium carbonate ($CaCO_3$), magnesium hydroxide ($Mg(OH)_2$) and barium sulfate ($BaSO_4$).

The Izod impact strength of the composite is higher than 11 kg-cm/cm and the flexural modulus of the composite is higher than 17000 kg/cm². The inorganic particles have high stiffness (indicated by high flexural modulus). The composite formed by using the forming method of the disclosure further has high toughness (indicated by high impact strength) because the micro-voids generated by the nm-sized inorganic particles dispersed in the polypropylene homopolymer base absorb nearby stress. Since the inorganic particles are uniformly dispersed in the composite formed by using the forming method of the disclosure to reduce agglomeration, more micro-voids of similar varieties can be formed to improve the toughness of the composite. The composite having high stiffness and high toughness can be used in various types of housings and frames such as the housing of audio equipment or a mobile phone, the frame of an LCD and the base of a vehicle lamp.

The properties of the inorganic particles having excellent dispersion and low agglomeration in the polypropylene homopolymer base also help to improve other properties. For example, in some embodiments, the composite formed by using the forming method of the disclosure has a coefficient of heat conduction higher than 0.25 W/m·K. In some embodiments in which titanium dioxide is used, the composite formed by using the forming method of the disclosure can have a reflectivity of the light higher than 90%, and is suitable to be used in the base of a vehicle lamp for reducing light consumption and increasing extraction efficiency.

Exemplary Examples and Comparison Examples

Details of the method for forming composite according to the disclosure have been described in above disclosure. Here below, several exemplary examples of the composite formed by using the forming method of the disclosure are disclosed in conjunction with several comparison examples to provide more descriptions in details to those who have general knowledge in the technology field of the disclosure.

Table 1 summarizes several exemplary examples of the composite formed by using the forming method of the disclosure. The composite of the exemplary examples is formed by using the forming method illustrated in FIG. 2. The addition amounts of the polypropylene homopolymer and the inorganic particles are based on weight percentage (wt %). In respect of the toughness of the composite, the Izod notched impact strength is measured by using the ASTM D256 method. In the respect of stiffness of the composite, the flexural modulus is measured by using the ASTM D790 method. Besides, the reflectivity of the composite is measured by using the CIE 1976 method, and the thermal conductivity of the composite is measured by using the thermal constants analyzer (hot disk AB) according to the ISO/DIS 22007-2 standard.

As indicated in Table 1, the Izod impact strength of each exemplary example is higher than 11 kg-cm/cm, such as higher than 11.4 kg-cm/cm, and the flexural modulus of each exemplary example is higher than 17000 kg/cm². That is, each exemplary example has excellent performance in toughness and stiffness. In comparison to the comparison examples not using the inorganic particles (such as comparison example 1 of Table 2), the toughness of the exemplary examples 1~8 is increased by at least 2.5 times, wherein the toughness of exemplary examples 3, 4 and 8 is even increased to be higher than 70 kg-cm/cm. The reflectivity of the light of exemplary examples 1, 2, 3, and 8 are further higher than 90% and the coefficients of heat conduction of exemplary examples 1, 2, 3, and 8 are higher than 0.25 W/m·K. To be more specifically, the reflectivity of the light is higher than 93.2% and the coefficient of heat conduction is higher than 0.28 W/m·K or even reaches 0.46 W/m·K.

TABLE 1

|  | E.E. 1 | E.E. 2 | E.E. 3 | E.E. 4 | E.E. 5 | E.E. 6 | E.E. 7 | E.E. 8 |
|---|---|---|---|---|---|---|---|---|
| PP (MI = 0.8) | 90 | 80 | 70 | 60 | 90 | 50 | 71 | 54 |
| $CaCO_3$ (100 nm) |  |  |  |  | 10 |  |  |  |
| $TiO_2$ (300 nm) | 10 | 20 | 30 | 40 |  |  |  | 23 |
| $Mg(OH)_2$ (600 nm) |  |  |  |  |  |  | 29 | 23 |
| $BaSO_4$ (1000 nm) |  |  |  |  |  | 50 |  |  |
| Izod impact modulus (kg-cm/cm) | 16.7 | 22.1 | 71.6 | 79.3 | 14.6 | 11.4 | 17.2 | 72.8 |

TABLE 1-continued

|  | E.E. 1 | E.E. 2 | E.E. 3 | E.E. 4 | E.E. 5 | E.E. 6 | E.E. 7 | E.E. 8 |
|---|---|---|---|---|---|---|---|---|
| Flexural Modulus (kg/cm$^2$) | 17943 | 17114 | 18506 | 20826 | 17236 | 25663 | 24013 | 29450 |
| Reflectivity (%) | 93.2 | 96.2 | 96.8 |  |  |  |  | 95.2 |
| Coefficient of Heat Conduction (W/m · K) | 0.28 | 0.30 | 0.34 |  |  |  |  | 0.46 |

[Note]
"E.E." is the abbreviation of "Exemplary Example"

Figure 4:
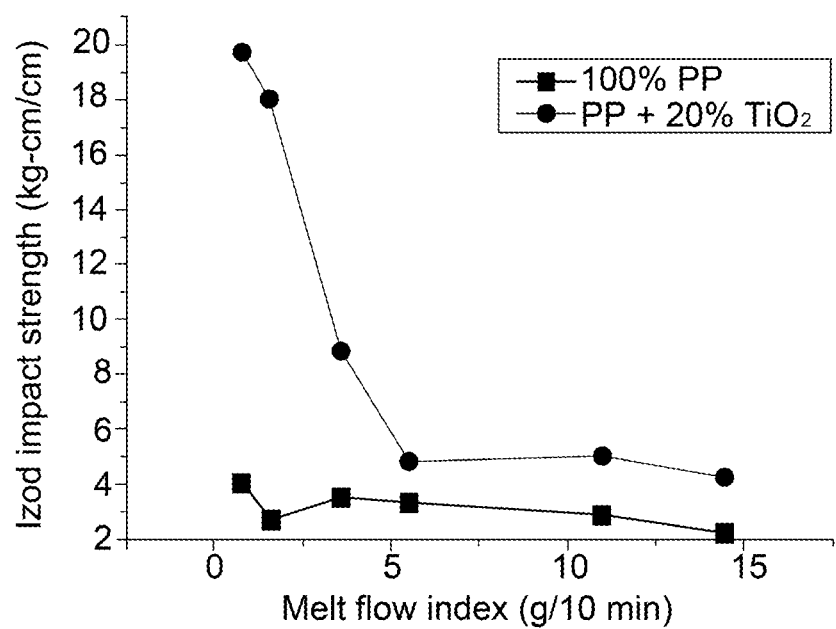
FIG. 4 shows the impact of process condition of the method for forming composite according to an embodiment of the disclosure.

Table 2 shows several comparison examples of the composite formed by using the forming method of the disclosure. The stiffness and toughness of the composite of the comparison examples are tested by the same method used for testing for the exemplary examples of Table 1. In the comparison example 1, no inorganic particles are added to the polypropylene homopolymer, and the polypropylene homopolymer not mixed with any inorganic particles has lower flexural modulus and lower Izod impact modulus, wherein lower flexural modulus indicates inferior stiffness and lower Izod impact modulus indicates inferior toughness. The inorganic particles having larger particle sizes and the inorganic particles having smaller particle sizes are respectively used in the comparison examples 2 and 3 but do not do much good to improving the toughness of the composite. In the comparison example 4, elastomer SEBS is used instead of the inorganic particles, and the toughness of the composite is significantly increased but the stiffness turns to deteriorate. In the comparison example 5, the polypropylene homopolymer having a higher melt flow index is used. In comparison to the exemplary example 2, the polypropylene homopolymer having a higher melt flow index used in the comparison example 5 is incapable of improving the toughness of the composite. Referring to FIG. 4, the impact of the melt flow index of the polypropylene homopolymer on the toughness of the composite is shown. In the example in which TiO$_2$ occupies 20 wt % of the composite, when the melt flow index is below 5.0, the Izod impact modulus starts to increase significantly, and when the melt flow index is below 3.6, the composite has very high Izod impact modulus.

TABLE 2

|  | Comparison Example 1 | Comparison Example 2 | Comparison Example 3 | Comparison Example 4 | Comparison Example 5 |
|---|---|---|---|---|---|
| PP (MI = 0.8) | 100 | 80 | 80 | 90 |  |
| PP (MI = 3.6) |  |  |  |  | 80 |
| TiO$_2$ (25 nm) |  | 20 |  |  |  |
| TiO2 (300 nm) |  |  |  |  | 20 |
| CaCO$_3$ (3000 nm) |  |  | 20 |  |  |
| SEBS |  |  |  | 10 |  |
| Izod impact modulus (kg-cm/cm) | 4 | 4.1 | 9.0 | 35 | 8.8 |
| Flexural Modulus (kg/cm$^2$) | 16632 | 18073 | 22163 | 13510 | 20470 |

Table 3 shows the impact of the use of five kneading blocks 220 on the properties of the composite. Except that five continuous kneading blocks 220 are not used (no kneading blocks 220 are disposed at the positions of FIG. 2 at which five continuous kneading blocks 220 were originally disposed), the process conditions of each comparison examples of the contrast groups are the same as that of the exemplary examples. In comparison to the corresponding comparison example, the toughness of each exemplary example is improved, and the Izod impact modulus of the exemplary example 3 is even 3.6 times of that of the comparison example 7. The observation made by using the scanning electronic microscopy shows that the agglomeration of the inorganic particles in each comparison example is far higher than that in the corresponding exemplary example.

TABLE 3

|  | Contrast Group 1 | | Contrast Group 2 | |
|---|---|---|---|---|
|  | Comparison Example 6 | Exemplary Example 1 | Comparison Example 7 | Exemplary Example 3 |
| PP (MI = 0.8) | 90 | 90 | 70 | 70 |
| TiO$_2$ (300 nm) | 10 | 10 | 30 | 30 |
| Izod Impact Modulus (kg-cm/cm) | 12.7 | 16.7 | 19.9 | 71.6 |
| Flexural Modulus (kg/cm$^2$) | 17114 | 17943 | 19913 | 18506 |
| Agglomerate (% of area) | 8.6 | 0.1 | 16.7 | 0.1 |

In the method for forming composite according to an embodiment of the disclosure, by using the twin screw extruder equipped with five continuous kneading blocks, the polypropylene homopolymer and the inorganic particles are mixed together, and the inorganic particles are uniformly dispersed in the polypropylene homopolymer to improve the stiffness, toughness and other properties of the composite without adding any auxiliary agents such as dispersant to the composite. Through the method for forming composite according to an embodiment of the disclosure, the inorganic particles whose particle sizes are between 100 nm to 1000 nm are uniformly dispersed in the polypropylene homopolymer whose melt flow index is lower than 3.6 g/10 min to increase both the stiffness and the toughness of the composite without adding any elastomers.

The composite formed by using the method according to an embodiment of the disclosure has high stiffness and high toughness, and can be used in various types of housings and frames such as the housing of audio equipment or a mobile phone, the frame of an LCD and the base of a vehicle lamp. In some embodiments, the composite formed by using the method of the disclosure further has a high reflectivity of the light and/or a large coefficient of heat conduction, and can be used in a large variety of areas. In general, the polypropylene homopolymer has smaller specific gravity and is cheaper than the commonly used polymers such as polycarbonate (PC) and polyethylene terephthalate (PBT). When the polypropylene homopolymer is used as a base in a composite, the specific gravity and cost of the obtained composite can be reduced. Therefore, the composite formed by using the method according to an embodiment of the disclosure has smaller specific gravity and incurs lower cost.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for forming composite, comprising:
providing a polypropylene homopolymer and at least one kind of inorganic particles to a twin screw extruder, wherein said polypropylene homopolymer occupies 40 wt % to 90 wt % of the composite, said at least one kind of inorganic particles occupies 10 wt % to 60 wt % of the composite, the melt flow index of the polypropylene homopolymer is lower than 3.6 g/10 min, and the particle sizes of the inorganic particles are in a range of 100 nm to 1000 nm;
heating the polypropylene homopolymer to a molten state; and
enabling the molten-state polypropylene homopolymer and the inorganic particles to pass through said at least five kneading blocks of the twin screw extruder to be mixed together such that the inorganic particles are dispersed in the polypropylene homopolymer, wherein adjacent two of the kneading blocks are interspaced by 0.5 to 2 screw pitches.

2. The method for forming composite according to claim 1, wherein a melting point of the polypropylene homopolymer provided to the twin screw extruder is in a range of 145° C. to 170° C.

3. The method for forming composite according to claim 1, wherein said at least one kind of inorganic particles provided to the twin screw extruder comprises at least one of titanium dioxide, calcium carbonate, magnesium hydroxide and barium sulfate.

4. The method for forming composite according to claim 1, wherein each of the kneading blocks comprises five kneading discs.

5. The method for forming composite according to claim 1, further comprising:
preheating the polypropylene homopolymer to have fluidity.

6. The method for forming composite according to claim 5, wherein the step of preheating the polypropylene homopolymer is performed under a temperature of 140° C. to 160° C.

7. The method for forming composite according to claim 1, further comprising:
cooling mixture of the polypropylene homopolymer and the inorganic particles to obtain a solid-state composite, wherein the agglomerates of the inorganic particles whose sizes are larger than 1 μm occupy less than 10% of the area of the solid-state composite.

* * * * *